(12) United States Patent
Kennealy

(10) Patent No.: US 7,631,525 B1  
(45) Date of Patent: Dec. 15, 2009

(54) WHEEL LOCK APPARATUS

(76) Inventor: Lee Kennealy, 84 Brunel Road, Southcote, Reading, Berkshire (GB) RG30 3JL ( * ) Notice: Subject to any disclaimer, the term of this patent is extended or adjusted under 35 U.S.C. 154(b) by 0 days.

(21) Appl. No.: 12/356,287

(22) Filed: Jan. 20, 2009

(51) Int. Cl.  
B62H 5/00 (2006.01)  
E05B 71/00 (2006.01)

(52) U.S. Cl. .......................... 70/227; 70/233
(58) Field of Classification Search .............. 70/34, 70/225–228, 233–236; 211/5; 248/551–553; 280/288.4  
See application file for complete search history.

(56) References Cited

U.S. PATENT DOCUMENTS

| | | | | |
|---|---|---|---|---|
| 544,132 | A * | 8/1895 | Shoots | 70/227 |
| 590,609 | A * | 9/1897 | Campbell | 280/296 |
| 603,780 | A * | 5/1898 | Wright | 70/227 |
| 624,949 | A * | 5/1899 | Lapaugh | 70/227 |
| 654,672 | A * | 7/1900 | Rich | 70/227 |
| 813,937 | A * | 2/1906 | Ballod | 70/227 |
| 981,359 | A * | 1/1911 | Balwick | 70/227 |
| 1,194,034 | A * | 8/1916 | Koch | 70/227 |
| 1,218,336 | A * | 3/1917 | Taralle | 70/227 |
| 1,402,725 | A * | 1/1922 | Pippen | 70/227 |
| 1,654,017 | A * | 12/1927 | Schlener | 70/227 |
| 2,099,606 | A * | 11/1937 | Holsen | 70/227 |
| 2,532,864 | A * | 12/1950 | Theodorackis | 70/227 |
| 2,706,901 | A | 4/1955 | Jenkins | |
| 3,988,910 | A | 11/1976 | Widen | |
| 4,055,060 | A * | 10/1977 | Bellino | 70/234 |
| 4,180,998 | A | 1/1980 | Hellman | |
| D259,764 | S | 7/1981 | Fouhy | |
| 4,459,833 | A | 7/1984 | Waterkamp et al. | |
| 4,571,965 | A * | 2/1986 | LeRoux | 70/227 |
| 5,069,049 | A | 12/1991 | Shieh | |
| 5,628,214 | A * | 5/1997 | Evers | 70/227 |
| 5,956,983 | A | 9/1999 | Huges | |

* cited by examiner

*Primary Examiner*—Lloyd A Gall  
(74) *Attorney, Agent, or Firm*—Crossley Patent Law; Mark A. Crossley

(57) ABSTRACT

The wheel lock apparatus is supplied as original equipment and as an aftermarket addition. The apparatus comprises two fork clamps, each of which is fastened around an opposed fork of a vehicle, the opposed forks partially surrounding the vehicle wheel. The apparatus is useful with virtually any form of spoked wheel through which the lock pin is selectively inserted to lock a vehicles wheel against rotation. Additionally, along with locking the vehicle wheel against rotation, the wheel is locked to the forks, preventing potential wheel theft, not only vehicle theft.

11 Claims, 7 Drawing Sheets

WHEEL LOCK APPARATUS

BACKGROUND OF THE INVENTION

The value of locking a wheeled vehicle to prevent theft, such as that of a bicycle, motorcycle, or carriage is well understood. However, several problems exist with various locking devices heretofore proposed. First, most devices are cumbersome and must be carried by a rider when not in use. Also, various devices have offered frame locks, with which a bicycle frame, for example, is locked to some stationary object, but the wheels are still subject to theft. A device which does not prevent wheel rotation also has very little value. Other desirable features not typically offered include light weight and aesthetic appeal. The present apparatus provides for locking a wheel by passage of a lock pin through the spokes, inside the wheel diameter. The apparatus is bolted to opposing forks in a permanent fashion. The apparatus requires only that a rider carry a key for operation. The apparatus is fashionably designed, lightweight, and unobtrusive.

FIELD OF THE INVENTION

The wheel lock apparatus relates to bicycle and motorcycle security devices and more especially to a wheel lock for a bicycle or like vehicle which locks a wheel between two opposed forks, and prevents wheel rotation.

SUMMARY OF THE INVENTION

The general purpose of the wheel lock apparatus, described subsequently in greater detail, is to provide a wheel lock apparatus which has many novel features that result in an improved wheel lock apparatus which is not anticipated, rendered obvious, suggested, or even implied by prior art, either alone or in combination thereof.

To attain this, the wheel lock apparatus is supplied as original equipment and as an aftermarket addition. The apparatus comprises two fork clamps, each of which is fastened around an opposed fork of a vehicle, the opposed forks partially surrounding the vehicle wheel. The apparatus is useful with virtually any form of spoked wheel through which the lock pin is selectively inserted to lock a vehicles wheel against rotation. Additionally, along with locking the vehicle wheel against rotation, the wheel is locked to the forks, preventing potential wheel theft, not only vehicle theft. The size and shape of each embodiment of the clamps is significant. While a plurality of streamlined clamp shapes are provided, the preferred embodiment features a substantially prolate spheroid for each clamp. Each clamp is only about 3½ inches in height. Each clamp is only about 1¾ inches in width.

Thus has been broadly outlined the more important features of the improved wheel lock apparatus so that the detailed description thereof that follows may be better understood and in order that the present contribution to the art may be better appreciated.

An object of the wheel lock apparatus is to lock a spoked wheel to a forked vehicle.

Another object of the wheel lock apparatus is to prevent rotation of a spoked vehicle wheel.

A further object of the wheel lock apparatus is to be substantially permanently affixed to the forks of the vehicle.

An added object of the wheel lock apparatus is to be compact.

And, an object of the wheel lock apparatus is to be streamlined.

These together with additional objects, features and advantages of the improved wheel lock apparatus will be readily apparent to those of ordinary skill in the art upon reading the following detailed description of presently preferred, but nonetheless illustrative, embodiments of the improved wheel lock apparatus when taken in conjunction with the accompanying drawings.

In this respect, before explaining the current embodiments of the improved wheel lock apparatus in detail, it is to be understood that the wheel lock apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved wheel lock apparatus. It is therefore important that the claims be regarded as including such equivalent constructions insofar as they do not depart from the spirit and scope of the wheel lock apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 7 thereof, the principles and concepts of the wheel lock apparatus generally designated by the reference number 10 will be described.

Figure 1:
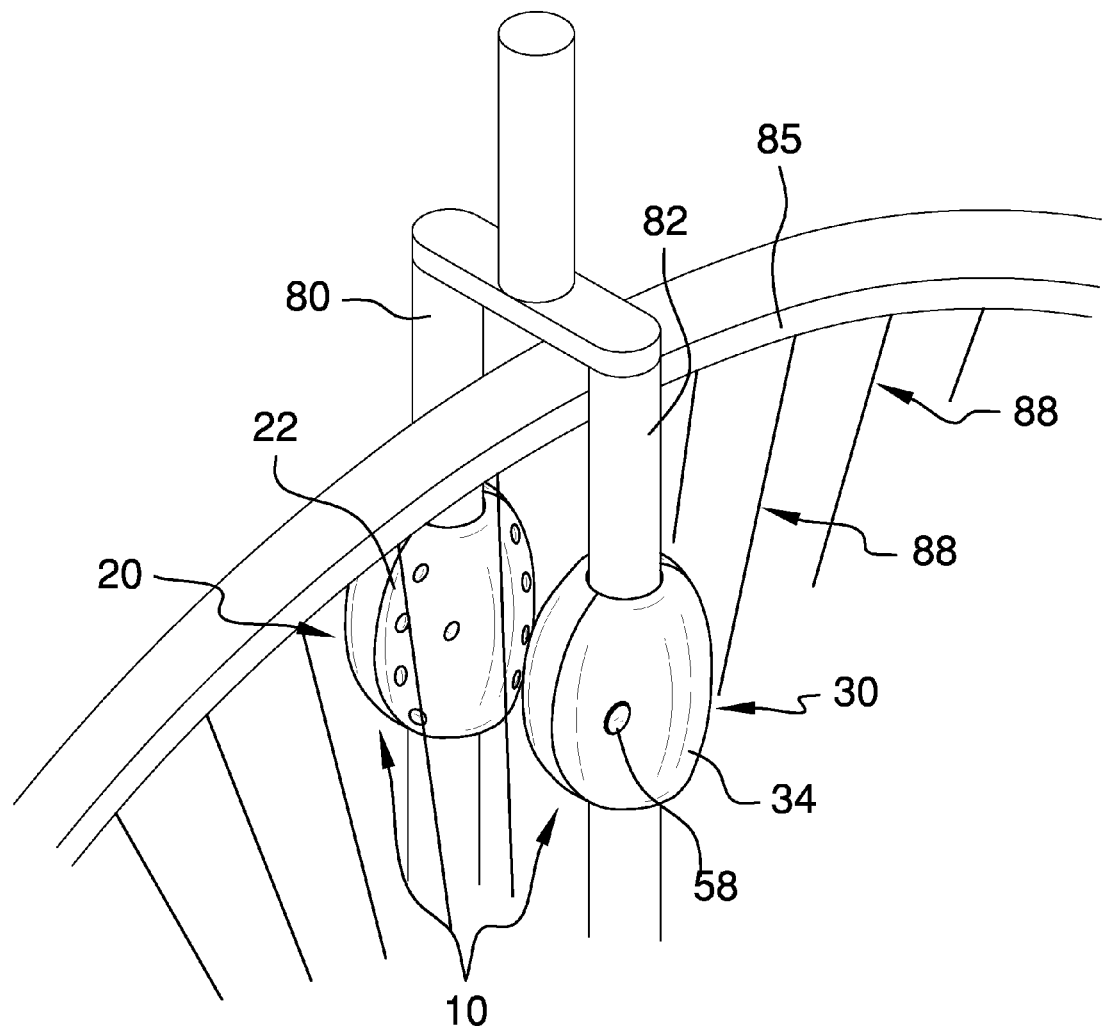
FIG. 1 is a perspective left side view of the installed apparatus, the wheel unlocked.

Referring to FIG. 1, the apparatus 10 is installed on bicycle forks. The first fork clamp 20 is affixed to the first fork 80. The opposing second fork clamp 30 is affixed to the second fork 82. The forks partially surround the wheel 85 having a plurality of spokes 88. The apparatus 10 is unlocked, thereby allowing wheel 85 turn. The blanking barrel 58 is selectively inserted into the second outer section 34 of the second clamp 30. Each of the fork clamps provides a streamlined generally prolate spheroid shape 64 such that vehicle aerodynamics are unaffected. The clamps' shapes also provide an aesthetic appeal.

Figure 2:
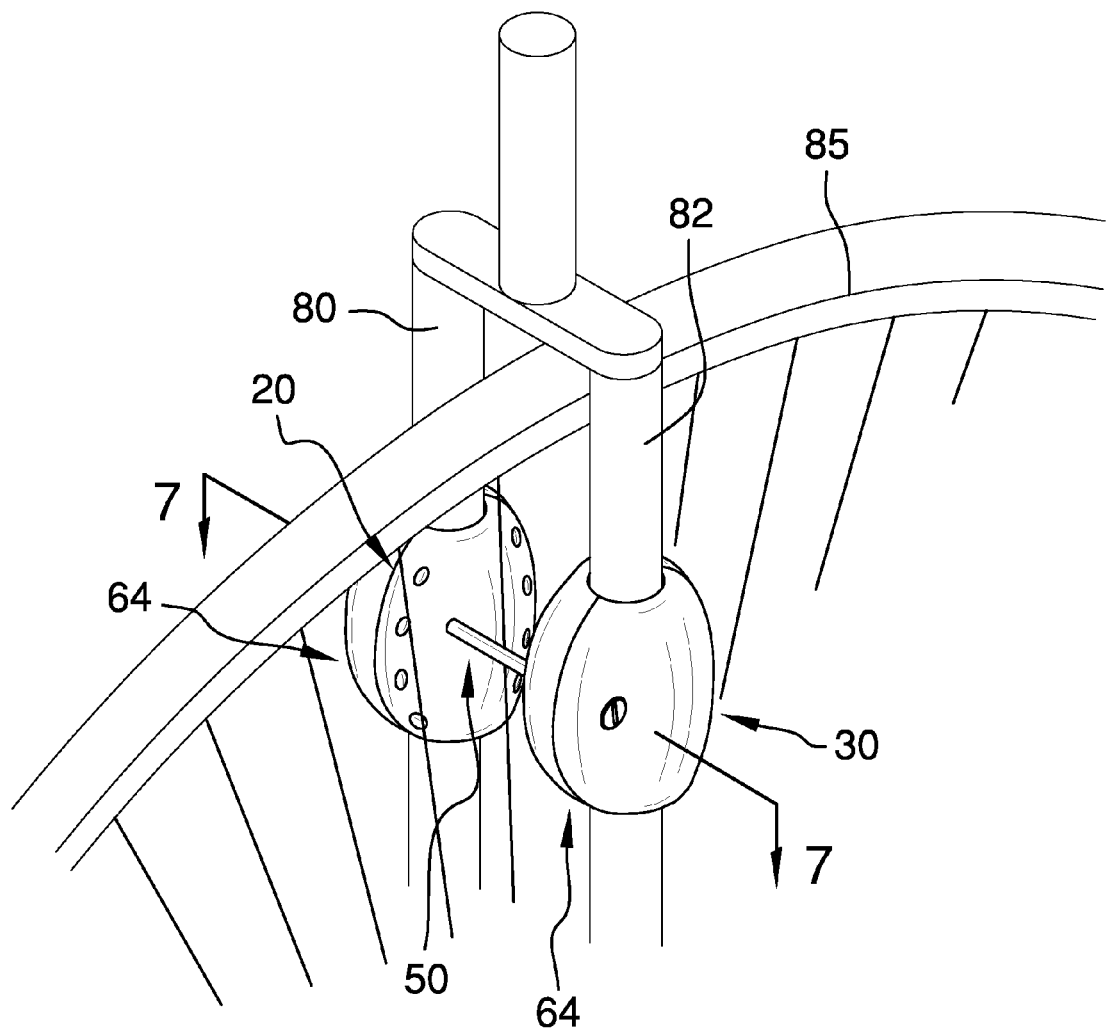
FIG. 2 is a perspective left side view of the installed apparatus, the wheel locked.

Referring to FIG. 2, the apparatus 10 has been locked with the lock pin 50 inserted through the spokes 88. The apparatus 10 thereby not only selectively locks against wheel rotation but also locks the wheel 85 to the front forks, preventing wheel 85 theft. The streamlined prolate spheroid shape 64 of the fork clamps is important.

Figure 3:
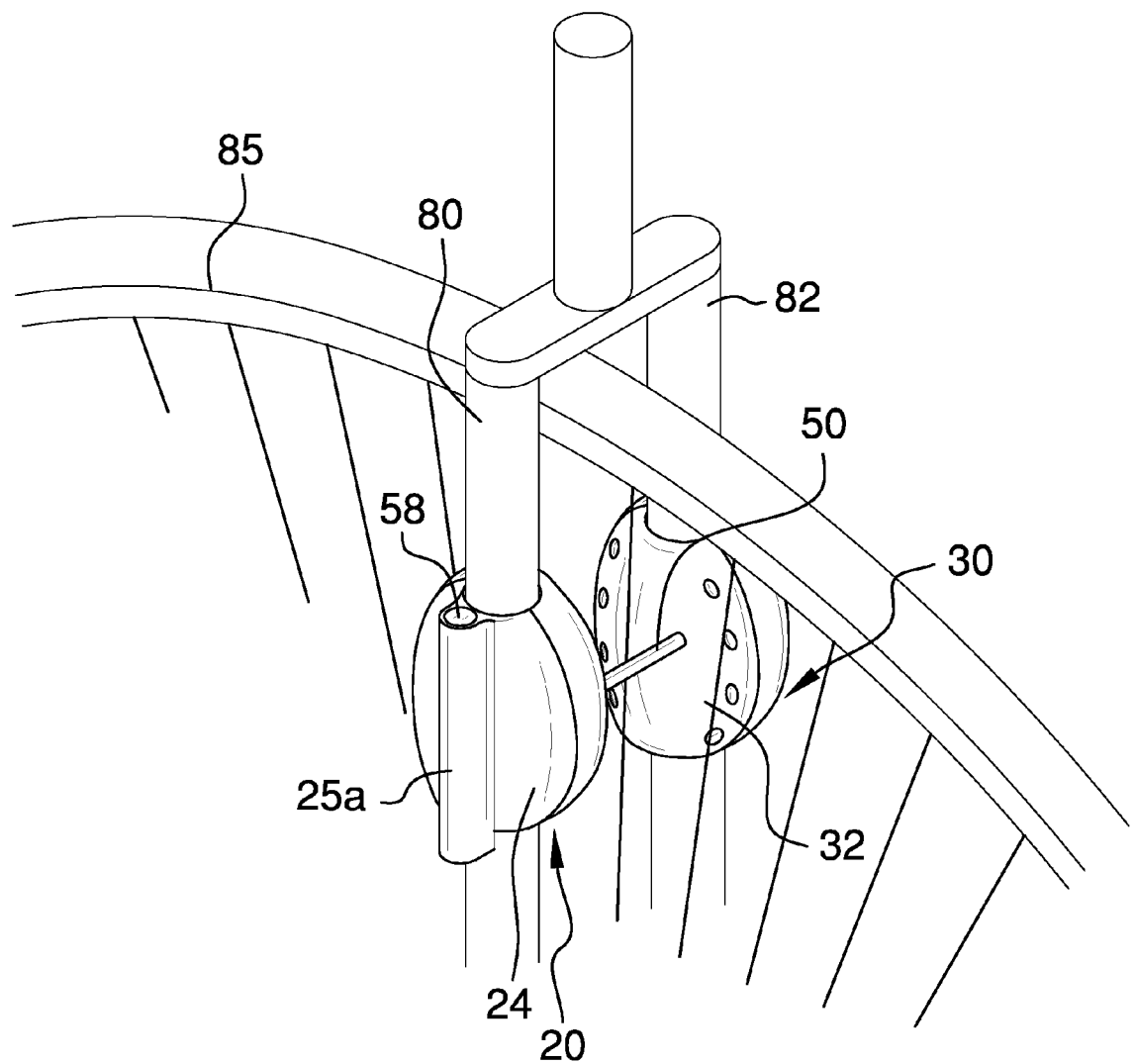
FIG. 3 is a perspective right side view of the installed apparatus, the wheel locked.

Referring to FIG. 3, the lock pin 50 is in position locking the wheel 85 to the forks. The blanking barrel 58 is inserted into the lock pin storage 25a. The blanking barrel 58 prevents invasion of foreign particles when in use in either the lock pin storage 25a or the barrel receptacle 35.

Figure 4:
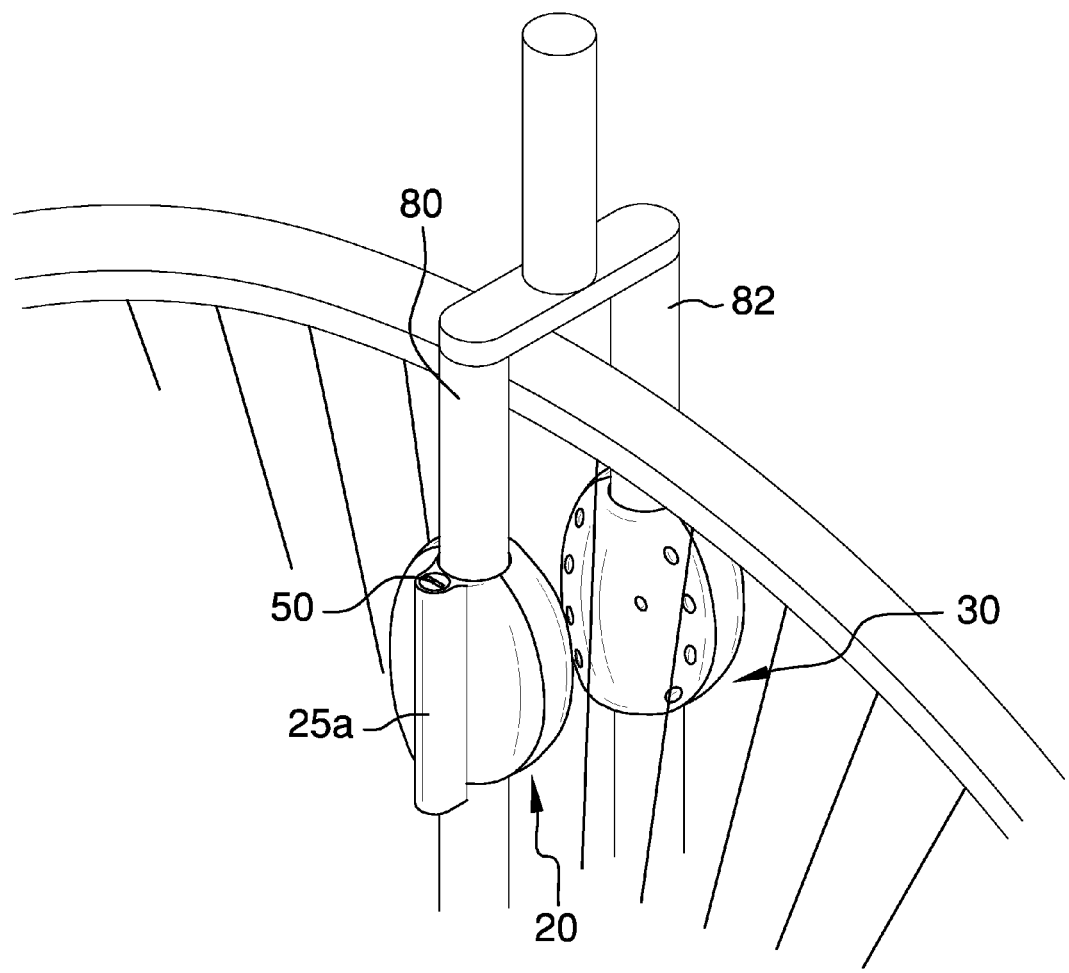
FIG. 4 is a perspective right side view of the installed apparatus, the wheel unlocked.

Referring to FIG. 4, the lock pin 50 is stored in the lock pin storage 25a until needed and removed.

Figure 5:
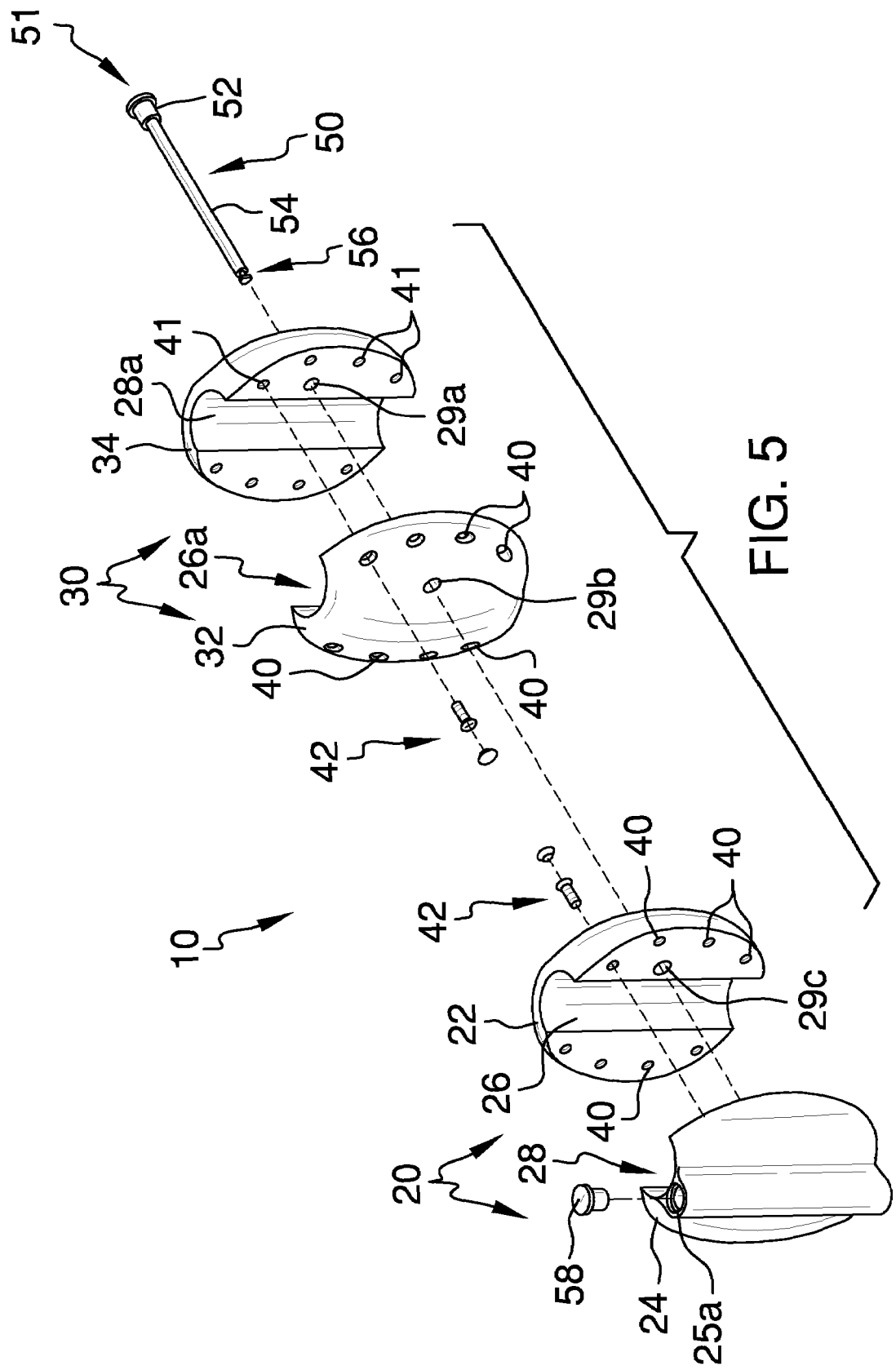
FIG. 5 is an exploded perspective right side view.
Figure 6:
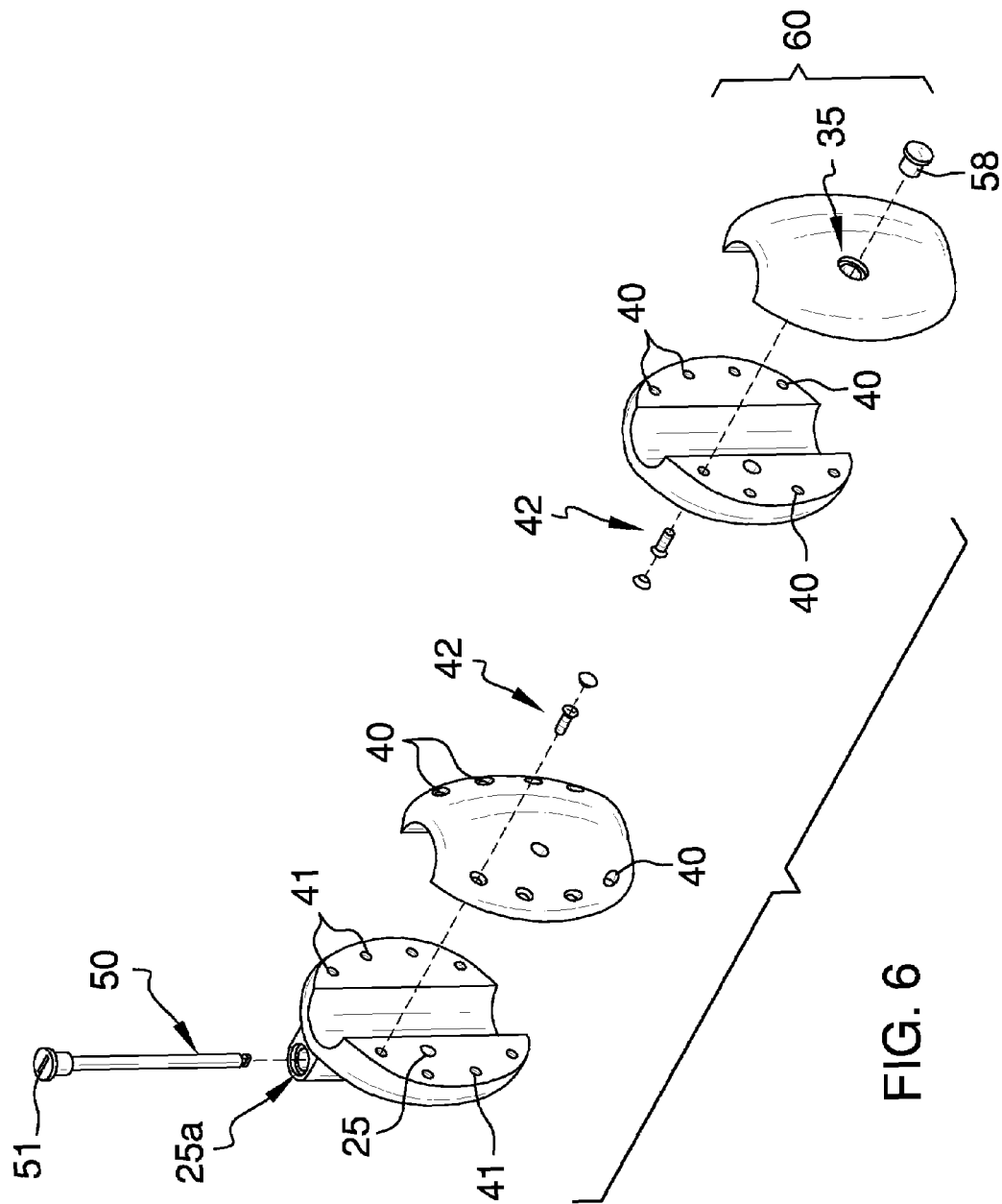
FIG. 6 is an exploded perspective left side view.

Referring to FIGS. 5 and 6, the wheel lock apparatus 10, comprises, in combination the pair of fork clamps comprising a first fork clamp 20 and the second fork clamp 30. The first fork clamp 20 comprises a first inner section 22. A first half cylinder cutout 26 is vertically disposed within the first inner section 22. The plurality of spaced apart bolt orifices 40 is disposed horizontally within the first inner section 22. The first outer section 24 mates to the first inner section 22 around the existing first fork 80. The second half cylinder cutout 28 is vertically disposed within the first outer section 24. The vertically disposed lock pin storage 25a is disposed within the first outer section 24. The blanking barrel 58 is removably disposed within the lock pin storage 25a, at user discretion. The lock pin chamber 25 is horizontally disposed within the first outer section 24. A plurality of bolt receptacles 41 is disposed horizontally within the first outer section 24. Each bolt receptacle 41 corresponds to a bolt orifice 40 of the first inner section 22. Each of the plurality of shear bolts 42 is inserted through one bolt orifice 40 and into one of the bolt receptacles 41. This fastens the first fork clamp 20 around the first vehicle fork 80. The shear bolts 42 are known in the arts for providing easy insertion and extremely difficult removal, one which involves a lengthy tool required extraction process. A lengthy extraction process is unlikely when theft is involved. The second fork clamp 30 comprises a second inner section 32. A first half cylinder cutout 26a is vertically disposed within the second inner section 32. A plurality of spaced apart bolt orifices 40 is disposed horizontally within the second inner section 32. A second lock pin orifice 29b is disposed horizontally within the second inner section 32. The second half cylinder cutout 28a is vertically disposed within the second outer section 34. The second outer section 34 attaches to the second inner section 32 around the second fork 82. The first lock pin orifice 29a is horizontally disposed within the second outer section 34. The barrel receptacle 35 is horizontally disposed adjacent to the first lock pin orifice 29a. The blanking barrel 58 is removably and selectively disposed within the barrel receptacle 35. The lock pin chamber 25 is horizontally disposed within the first outer section 24. The lock pin 50 can be therein stored when not in use locking a wheel 85. A plurality of bolt receptacles 41 is disposed horizontally within the second outer section 34. Each bolt receptacle 41 corresponds to a bolt orifice 40 of the second inner section 32. The plurality of shear bolts 42 is inserted through the bolt orifices 40 and into the bolt receptacles 41, thereby fastening the second fork clamp 30 around the second fork 82. The lock pin 50 is selectively inserted through the first lock pin orifice 29a, the second lock pin orifice 29b, the third lock pin orifice 29c, and into the lock pin chamber 25. The lock pin 50 is selectively inserted between any of a plurality of existing spokes 88 of the existing wheel 85.

Figure 7:
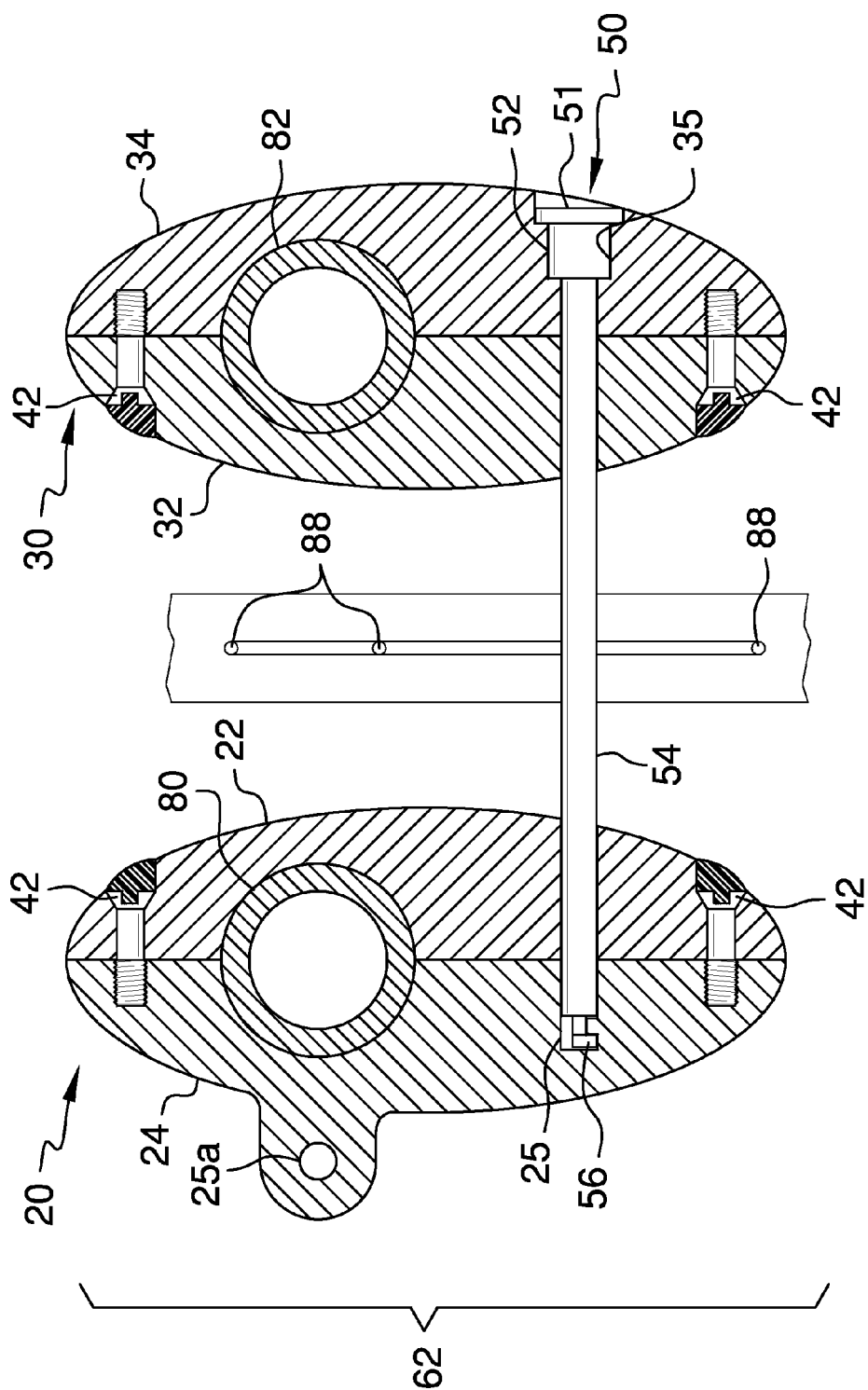
FIG. 7 is a cross sectional view of FIG. 1, taken along the line 7-7.

Referring to FIG. 7, the lock pin comprises a key receptacle 51 which provides for turning the lock pin 50 with the key (not shown), as desired. The lock pin 50 further comprises the pin barrel 52 adjacent to the key receptacle 51. The pin barrel 52 is selectively inserted into the barrel receptacle 35 of the second outer section 34 of the second fork clamp 30. The pin shaft 54 emanates from the pin barrel 52. The shoulder 56 is disposed at an end of the pin shaft 54, opposite the key receptacle 51. The shoulder 56 is selectively inserted into the lock pin chamber 25. Turning with the key locks and unlocks the lock pin 50 shoulder 56 within the chamber 25.

Further referring to FIGS. 6 and 7, the size and shape of the first fork clamp 20 and second fork clamp 30 are important. The height 60 of the clamps does not exceed about 3½ inches. The width 62 of the clamps does not exceed about 1¾ inches. Aerodynamics and aesthetic appeal are critical to most spoke wheeled vehicles to which the apparatus 10 is applied.

With respect to the above description then, it is to be realized that the optimum dimensional relationships for the parts of the wheel lock apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the wheel lock apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the wheel lock apparatus may be used.

Therefore, the foregoing is considered as illustrative only of the principles of the wheel lock apparatus. Further, since numerous modifications and changes will readily occur to those skilled in the art, it is not desired to limit the wheel lock apparatus to the exact construction and operation shown and described, and accordingly, all suitable modifications and equivalents may be resorted to, falling within the scope of the wheel lock apparatus.

What is claimed is:

1. A wheel lock apparatus, comprising, in combination:
   a pair of fork clamps comprising a first fork clamp attached to an existing vehicle first fork and a second fork clamp attached to an opposed existing vehicle second fork of a vehicle, the forks disposed on opposite sides of a wheel of the vehicle, each attached fork clamp having a streamlined shape, the first fork clamp comprising:
     a first inner section having a horizontally disposed third lock pin orifice;
     a first half cylinder cutout vertically disposed within the first inner section;
     a first outer section;
     a second half cylinder cutout vertically disposed within the first outer section;
     a lock pin chamber horizontally disposed within the first outer section;
     means for fastening the first inner section to the first outer section, around the vehicle first fork;
   the second fork clamp comprising:
     a second inner section;
     a half cylinder cutout vertically disposed within the second inner section;
     a second lock pin orifice disposed horizontally within the second inner section;
     a second outer section;
     a second half cylinder cutout vertically disposed within the second outer section;
     a first lock pin orifice horizontally disposed within the second outer section;
     a barrel receptacle horizontally disposed adjacent to the first lock pin orifice;
   means for fastening the second inner section to the second outer section, around the vehicle second fork;
   a lock pin selectively inserted through the first lock pin orifice, the second lock pin orifice, the third lock pin orifice, and into the lock pin chamber, the lock pin selectively inserted between any of a plurality of existing spokes of the existing vehicle wheel, the lock pin comprising:
a key receptacle;
a pin barrel adjacent to the key receptacle, the pin barrel selectively inserted into the barrel receptacle of the second outer section of the second fork clamp;
a pin shaft emanating from the pin barrel;
a shoulder at an end of the pin shaft, the shoulder selectively inserted into the lock pin chamber.

2. The apparatus according to claim 1 wherein the means for fastening the first inner section of the first fork clamp to the first outer section of the first fork clamp, around the vehicle first fork, further comprises a plurality of spaced apart bolt orifices disposed horizontally within the first inner section;
a plurality of bolt receptacles disposed horizontally within the first outer section, each bolt receptacle corresponding to a bolt orifice of the first inner section;
a plurality of bolts inserted through the bolt orifices into the bolt receptacles, fastening the first fork clamp around the first vehicle fork.

3. The apparatus according to claim 2 wherein the means for fastening the second inner section of the second fork clamp to the second outer section of the second fork clamp, around the second fork, further comprises a plurality of spaced apart bolt orifices disposed horizontally within the second inner section;
a plurality of bolt receptacles disposed horizontally within the second outer section, each bolt receptacle corresponding to a bolt orifice of the second inner section;
a plurality of bolts inserted through the bolt orifices into the bolt receptacles, fastening the second fork clamp around the second vehicle fork.

4. The apparatus according to claim 3 wherein the bolts further comprise shear bolts.

5. The apparatus according to claim 4 wherein a blanking barrel is further removably disposed within the barrel receptacle.

6. The apparatus according to claim 1 wherein the streamlined shape of each clamp further substantially comprises a prolate spheroid.

7. The apparatus according to claim 2 wherein the streamlined shape of each clamp further substantially comprises a prolate spheroid.

8. The apparatus according to claim 3 wherein the streamlined shape of each clamp further substantially comprises a prolate spheroid.

9. The apparatus according to claim 4 wherein the streamlined shape of each clamp further substantially comprises a prolate spheroid.

10. The apparatus according to claim 5 wherein the streamlined shape of each clamp further substantially comprises a prolate spheroid.

11. A wheel lock apparatus, comprising, in combination:
a pair of fork clamps comprising a first fork clamp attached to an existing vehicle first fork and a second fork clamp attached to an opposed existing second vehicle fork of a vehicle, the forks disposed on opposite sides of a wheel of the vehicle, each attached fork clamp having a substantially prolate spheroid shape, each clamp having a height of about 3½ inches, a width of about 1¾ inches, the first fork clamp comprising:
a first inner section having a horizontally disposed third lock pin orifice;
a first half cylinder cutout vertically disposed within the first inner section;
a plurality of spaced apart bolt orifices disposed horizontally within the first inner section;
a first outer section;
a second half cylinder cutout vertically disposed within the first outer section;
a vertically disposed lock pin storage disposed within the first outer section;
a blanking barrel removably disposed within the lock pin storage;
a lock pin chamber horizontally disposed within the first outer section;
a plurality of bolt receptacles disposed horizontally within the first outer section, each bolt receptacle corresponding to a bolt orifice of the first inner section;
a plurality of shear bolts inserted through the bolt orifices into the bolt receptacles, fastening the first fork clamp around the first vehicle fork; the second fork clamp comprising:
a second inner section;
a half cylinder cutout vertically disposed within the second inner section;
a plurality of spaced apart bolt orifices disposed horizontally within the second inner section;
a second lock pin orifice disposed horizontally within the second inner section;
a second outer section;
a second half cylinder cutout vertically disposed within the second outer section;
a first lock pin orifice horizontally disposed within the second outer section;
a barrel receptacle horizontally disposed adjacent to the first lock pin orifice, the blanking barrel removably disposed within the barrel receptacle;
a plurality of bolt receptacles disposed horizontally within the second outer section, each bolt receptacle corresponding to a bolt orifice of the second inner section;
a plurality of shear bolts inserted through the bolt orifices into the bolt receptacles, fastening the second fork clamp around the second vehicle fork;
a lock pin selectively inserted through the first lock pin orifice, the second lock pin orifice, the third lock pin orifice, and into the lock pin chamber, the lock pin selectively inserted between a plurality of existing spokes of the existing wheel, the lock pin comprising:
a key receptacle;
a pin barrel adjacent to the key receptacle, the pin barrel selectively inserted into the barrel receptacle of the second outer section of the second fork clamp;
a pin shaft emanating from the pin barrel;
a shoulder at an end of the pin shaft, the shoulder selectively inserted into the lock pin chamber.

* * * * *